US008030889B2

(12) United States Patent
Tamura et al.

(10) Patent No.: US 8,030,889 B2
(45) Date of Patent: Oct. 4, 2011

(54) DOCKING DEVICE

(75) Inventors: Fumio Tamura, Machida (JP); Hiroaki Agata, Yokohama (JP); Mitsuo Horiuchi, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 388 days.

(21) Appl. No.: 12/419,832

(22) Filed: Apr. 7, 2009

(65) Prior Publication Data

US 2009/0284222 A1    Nov. 19, 2009

(30) Foreign Application Priority Data

May 19, 2008    (JP) .................................. 2008-131352

(51) Int. Cl.
*H02J 7/00*    (2006.01)
*H02J 7/02*    (2006.01)

(52) U.S. Cl. ........ 320/112; 320/107; 320/110; 320/111; 320/113; 320/114; D13/107; D13/120

(58) Field of Classification Search .................. 320/112
See application file for complete search history.

(56) References Cited

U.S. PATENT DOCUMENTS 5,592,362 A * 1/1997 Ohgami et al. .......... 361/679.41
5,982,141 A * 11/1999 Hinohara ...................... 320/113

FOREIGN PATENT DOCUMENTS

JP    09-269848    10/1997
JP    2000-305656    11/2000

* cited by examiner

*Primary Examiner* — Edward Tso
*Assistant Examiner* — Ahmed Omar
(74) *Attorney, Agent, or Firm* — Anthony P. Ng; Yudell Isidore Ng Russell PLLC (57) ABSTRACT

A docking device for receiving a portable computer is disclosed. The docking device includes a device housing and a charging connector that is provided on a side surface of the device housing and is connected to a battery connector of a battery pack in order to charge the battery pack. The charging connector is connectable to the battery connector in a state where the battery pack and the device housing are disposed on the same plane. When the charging connector and the battery connector are in a connected state and the device housing is being moved to a position within a predetermined height from the plane, the connection state between the charging connector and the battery connector is maintained. When the device housing is being moved to a position that exceeds the predetermined height from the plane, the battery connector will be separated from the charging connector due to the weight of the battery pack.

6 Claims, 9 Drawing Sheets

DOCKING DEVICE

PRIORITY CLAIM

The present application claims benefit of priority under 35 U.S.C. §§120, 365 to the previously filed Japanese Patent Application No. JP2008-131352 entitled, "Docking Device" with a priority date of May 19, 2008, which is incorporated by reference herein.

BACKGROUND OF THE INVENTION

1. Technical Field

The present invention relates to docking devices in general, and in particular to a docking device capable of being mechanically and electrically connected to a portable computer to expand the capabilities of the portable computer.

2. Description of Related Art

In recent years, portable computers such as laptop personal computers (laptop PCs) have become ubiquitous. The capabilities of a laptop PC can be expanded without, compromising its portability via a docking device.

A docking device is a box-shaped appliance including various connection terminals such as a serial port and a parallel port, drives such as a CD-ROM drive and a DVD drive, and expansion slots. A connector for connecting to a connector of a laptop PC is provided on a top surface of the docking device. By mounting (docking) the laptop PC on the top surface of the docking device and connecting the connector of the laptop PC to the connector of the docking device, the capabilities of the docking device can be used as the capabilities of the laptop PC, thereby expanding the capabilities of the laptop PC.

For many laptop PCs, a packaged battery (battery pack) is detachably mounted to a laptop PC and used as a power source so that the laptop PC can be driven even in a place where commercial power is not available. In view of this, a docking device may include a function of charging a spare battery pack that is prepared separately from the battery pack mounted to the laptop PC. The docking device having the battery pack charging function includes a charging connector on its side surface, and a battery connector of the battery pack is connected to the charging connector in order to enable the battery pack to be charged.

When the docking device is being lifted by a user in a state where the battery connector is connected to the charging connector of the docking device, the battery pack leaves a plane of placement such as a desk, and as a result, the weight of the battery pack is put on the connection part with the docking device, which raises a possibility that the battery pack may drop off from the docking device. When the battery pack drops off from the docking device located at a high position and crashes to the ground, there is a danger that the battery pack may get damaged on impact.

SUMMARY OF THE INVENTION

The present invention, which is made in view of the above-mentioned circumstances, provides a docking device that is capable of preventing a battery pack from dropping. In accordance with a preferred embodiment of the present invention, a docking device includes a device housing and a charging connector that is provided on a side surface of the device housing and is connected to a battery connector of a battery pack in order to charge the battery pack. The charging connector is connectable to the battery connector in a state where the battery pack and the device housing are disposed on the same plane. When the charging connector and the battery connector are in a connected state and the device housing is being moved to a position within a predetermined height from the plane, the connection state between the charging connector and the battery connector is maintained. When the device housing is being moved to a position that exceeds the predetermined height from the plane, the battery connector will be separated from the charging connector due to the weight of the battery pack.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 5-1 to 5-3 are perspective views for explaining a state during which the charging connector from FIG. 3 is swung;

DETAILED DESCRIPTION OF A PREFERRED EMBODIMENT

Figure 1:
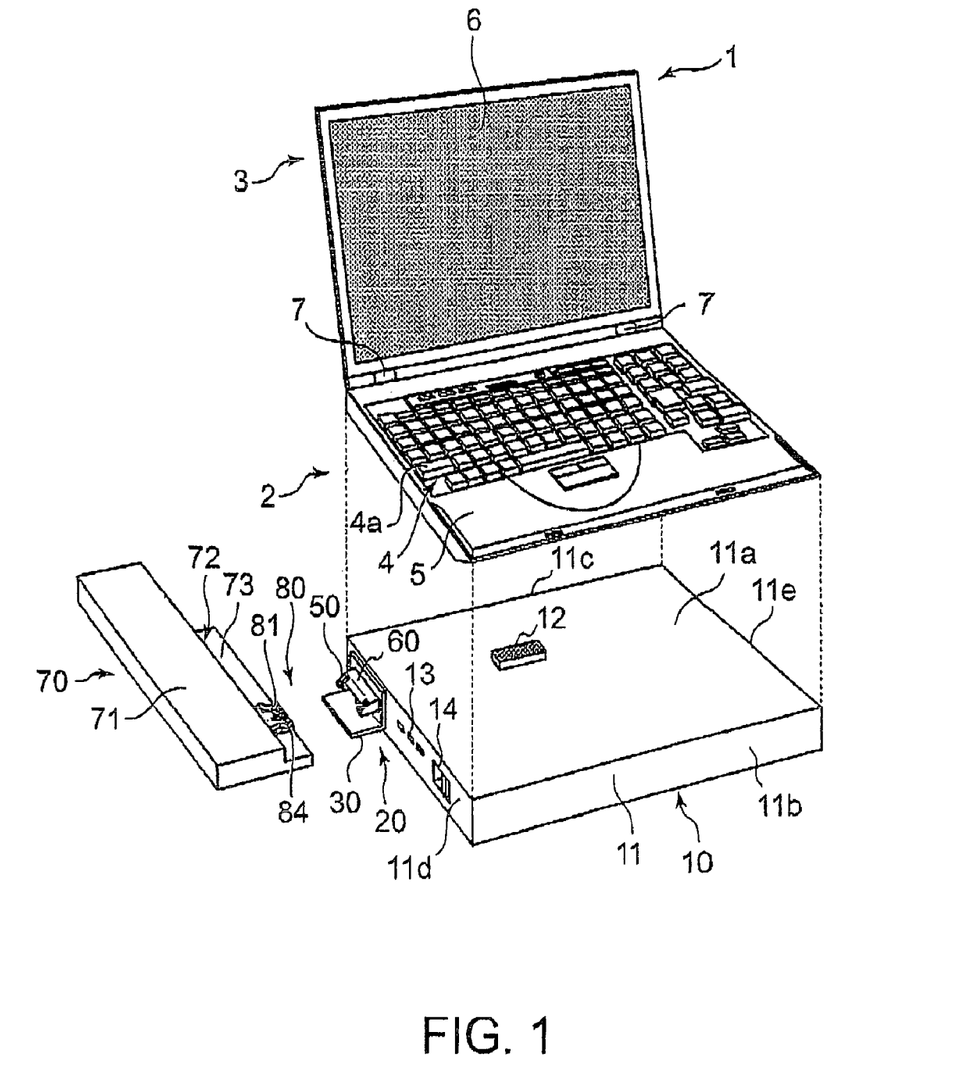
FIG. 1 is an isomeric view of a docking device along with a laptop personal computer and a battery pack.

Referring now to the drawings and in particular to FIG. 1, there is depicted a block diagram of an isomeric view of a laptop personal computer (laptop PC) 1, a docking device 10 capable of being mechanically and electrically connected to the laptop PC 1, and a battery pack 70 that can be charged when connected to a charging connector 20 of the docking device 10.

Figure 2:
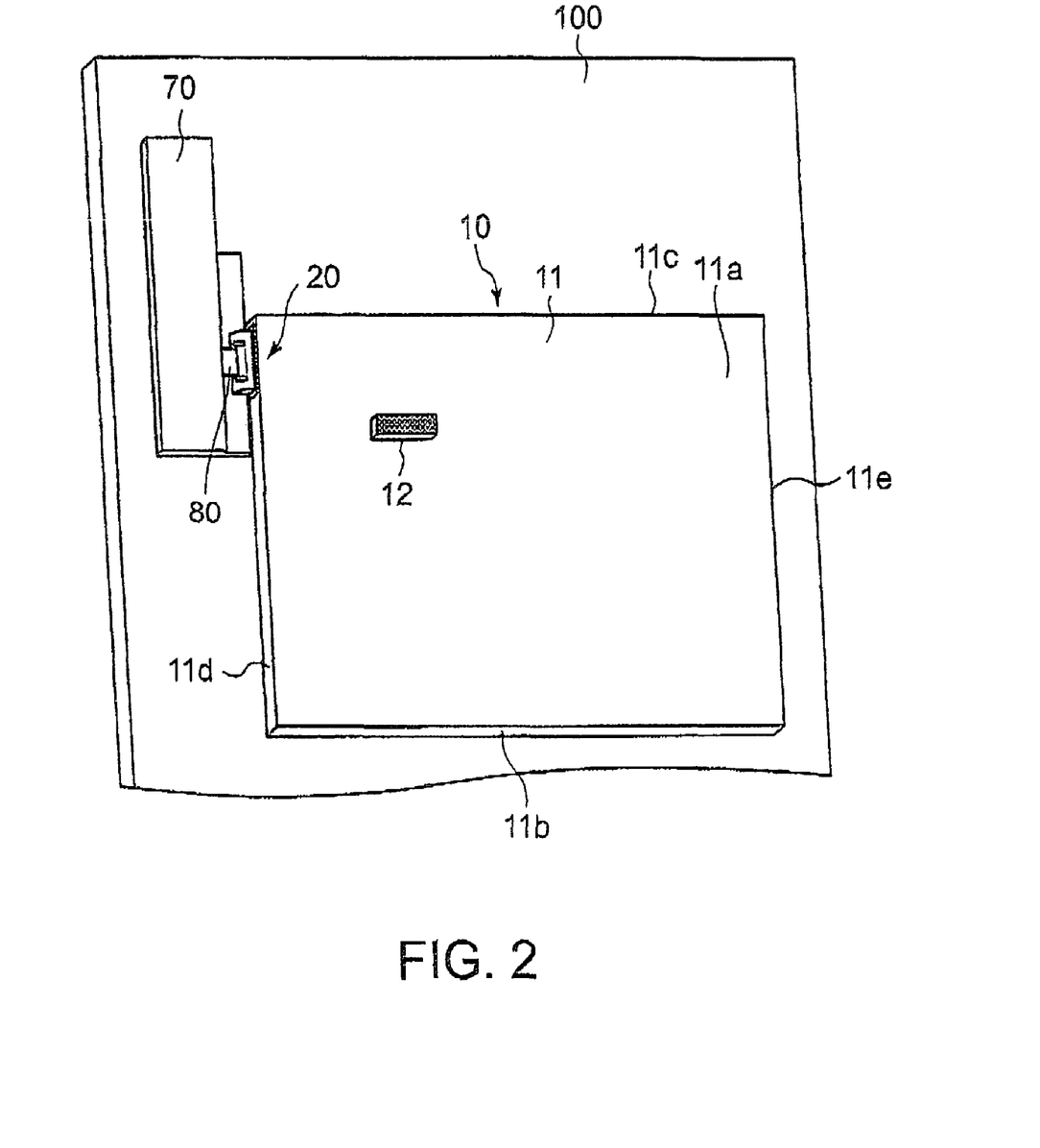
FIG. 2 is a top view of a battery pack being connected to a charging connector of the docking device from FIG. 1.

FIG. 2 is a top view of the docking device 10 and the battery pack 70 being placed on a plane 100 such as a desk, and the battery pack 70 is connected to the charging connector 20 of the docking device 10. Note that the laptop PC 1 is not shown in FIG. 2.

The laptop PC 1 shown as an example here is a portable computer that can be driven not only by commercial power supplied via a power cord (not shown) but also by power supplied from a battery pack (not shown) mounted in the laptop PC 1. The laptop PC 1 includes a body housing 2 and a lid 3.

The body housing 2 is a box body accommodating components (not shown) such as a CPU for providing control and a memory for providing storage. Though not shown, a battery mounting portion is provided by forming a depression at a front part of a bottom surface of the body housing 2, and a battery pack of the same shape as the battery pack 70 shown in FIG. 1 is mounted in this battery mounting portion. When the battery pack is mounted in the battery mounting portion of the laptop PC 1, a battery connector 80 provided in the battery pack 70 electrically connects to a connector in the battery mounting portion to supply driving power to the laptop PC 1.

In addition, a keyboard 4 is an input device composed of an arrangement of key tops 4a provided on a top surface of the body housing 2, and a palm rest area 5 is provided in front of the keyboard 4. Furthermore, though not shown in FIG. 1, a docking device-connection connector that is connected to a computer-connection connector 12 of the docking device 10 described later is provided on the bottom surface of the body housing 2.

The lid 3 is a box body accommodating a display device 6 such as a liquid crystal display (LCD) or an organic EL display. As shown in FIG. 1, a proximal end portion of the lid 3 is rotatably supported on a back edge of the body housing 2 by a hinge portion 7. When the lid 3 is opened from the body housing 2, the display device 6 is exposed to the front of the body housing 2 and also the top surface of the body housing 2 is put in an open condition. When the lid 3 is rotated via the hinge portion 7, on the other hand, the lid 3 functions as a cover for simultaneously concealing the top surface of the body housing 2 and the display device 6.

The docking device 10 is a device that can be mechanically and electrically connected to the above-mentioned laptop PC 1 to expand the capabilities of the laptop PC 1, and is driven by commercial power supplied via a power cord (not shown). The docking device 10 includes a docking device housing 11 and the charging connector 20 that is provided on the device housing 11 to charge the battery pack 70.

The device housing 11 is a box body that is constructed of a thin plate of a metal or the like and shaped approximately as a rectangular parallel piped. The device housing 11 includes a top surface portion 11a on which the laptop PC 1 is mounted, a front surface portion 11b that is a side surface on the front side of the device, a back surface portion 11c which is a side surface on the back side of the device, a left surface portion 11d that is a side surface on the left side of the device as seen from the front side, a right surface portion 11e which is a side surface on the right side of the device as seen from the front side, and a bottom surface portion (not shown) in contact with the plane 100 such as the desk. A power unit for driving the device by power supplied from a commercial power source, a charging device for charging the battery pack 70 described later, and driving devices such as a CD-ROM drive and a DVD drive are accommodated in the device housing 11 (though these are not shown).

The top surface portion 11a of the device housing 11 is a surface on which the laptop PC 1 is mounted, and has approximately the same size as the bottom surface of the laptop PC 1. As shown in FIGS. 1 and 2, the computer-connection connector 12 that is connected to the docking device-connection connector provided on the bottom surface of the body housing 2 of the laptop PC 1 is protruded from an approximately center part of the top surface portion 11a. The computer-connection connector 12 is connected to the above-mentioned driving devices accommodated in the device housing 11, and connection terminals, expansion slots, and the like described later. Though not shown, a latch for detachably fixing the laptop PC 1 to the top surface portion 11a is disposed at a predetermined position of the top surface portion 11a.

Connection terminals of a serial port, a parallel port, a USB port, an external display output connector, and the like, and expansion slots of a PCI bus and the like (both are not shown) are arranged on the back surface portion 11c and the right surface portion 11e of the device housing 11. In addition, the charging connector 20 described later, an indicator 13 for displaying the amount of charge of the battery pack 70 during charging, and an ejector 14 for releasing the engagement between the latch of the top surface portion 11a and the laptop PC 1 mounted on the top surface portion 11a are provided on the left surface portion 11d of the device housing 11.

By mounting (docking) the laptop PC on the top surface portion 11a of the device housing 11 and connecting the docking device-connection connector of the laptop PC to the computer-connection connector 12 of the docking device 10, the above-mentioned capabilities of the docking device can be used as the capabilities of the laptop PC so that the capabilities of the laptop PC can be expanded. Moreover, by operating the ejector 14, the engagement between the latch disposed on the top surface portion 11a of the device housing 11 and the laptop PC 1 is released, so that the laptop PC 1 can be detached from the docking device 10.

Note that the docking device 10 is not limited to the above-mentioned structure, and a small-sized expansion unit such as a port replicator including only connection terminals of a serial port, a parallel port, and the like is also applicable.

The charging connector 20 is disposed on a back part of the left surface portion 11d of the device housing 11, as shown in FIG. 1. As explained later, the charging connector 20 is connected to the battery connector 80 of the battery pack 70 to supply power to the battery pack 70. Note that the battery pack 70 charged by the charging connector 20 is the spare battery pack 70 that is prepared separately from the battery pack mounted in the battery mounting portion of the laptop PC 1. That is, the docking device 10 can charge the spare battery pack 70 while the laptop PC 1 is being used. Moreover, the docking device 10 can charge the battery pack 70 even in the case where the docking device 10 is used singly without the laptop PC 1 being mounted thereon. The following explains the charging connector 20 provided in the docking device 10 and the battery pack 70 charged by this charging connector 20, in details.

Figure 3:
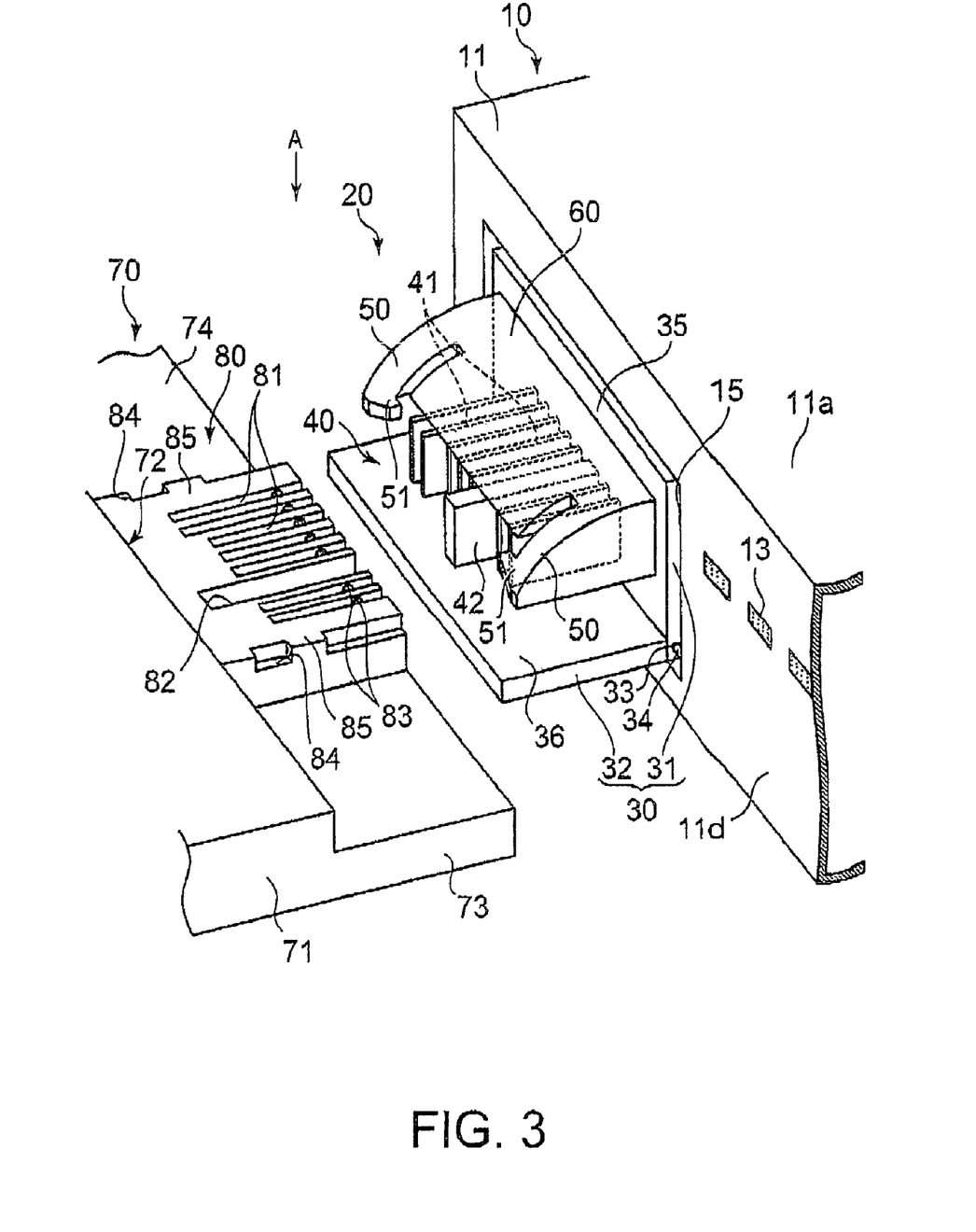
FIG. 3 is an enlarged view of the charging connector of the docking device and a battery connector of the battery pack from FIG. 1.
Figure 4:
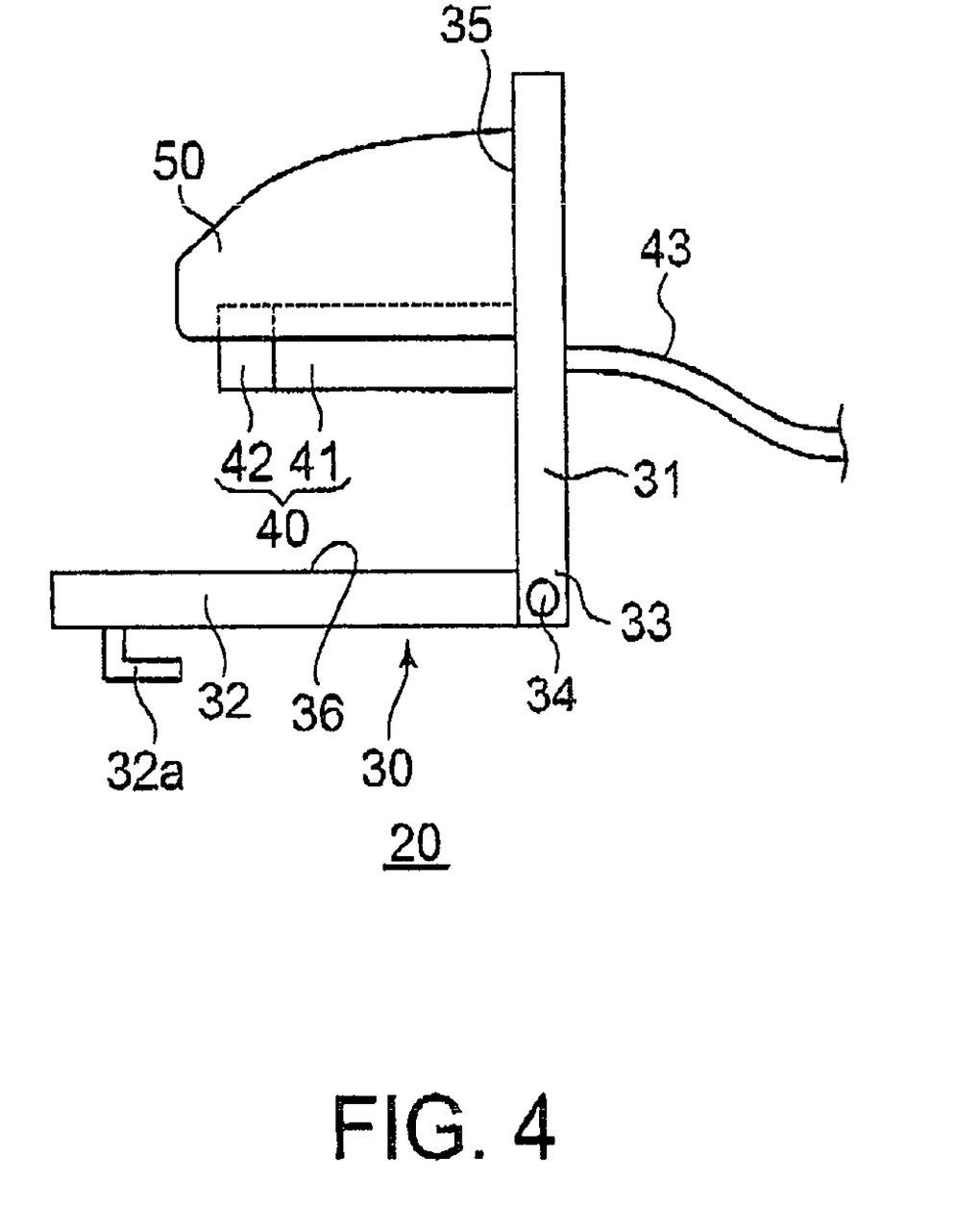
FIG. 4 is a side view of the charging connector from FIG. 3.
Figure 6:
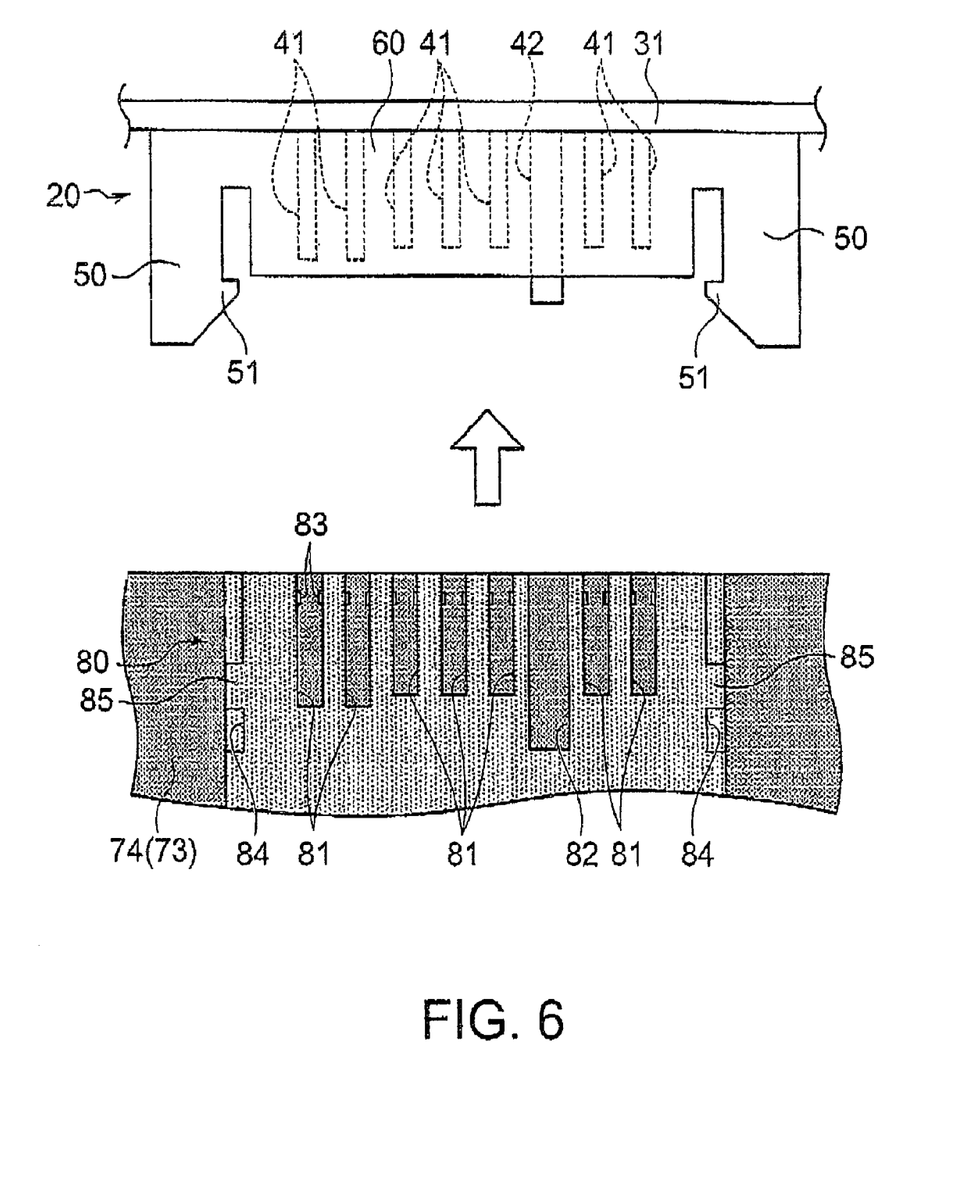
FIG. 6 is a top view of FIG. 3.
Figure 7:
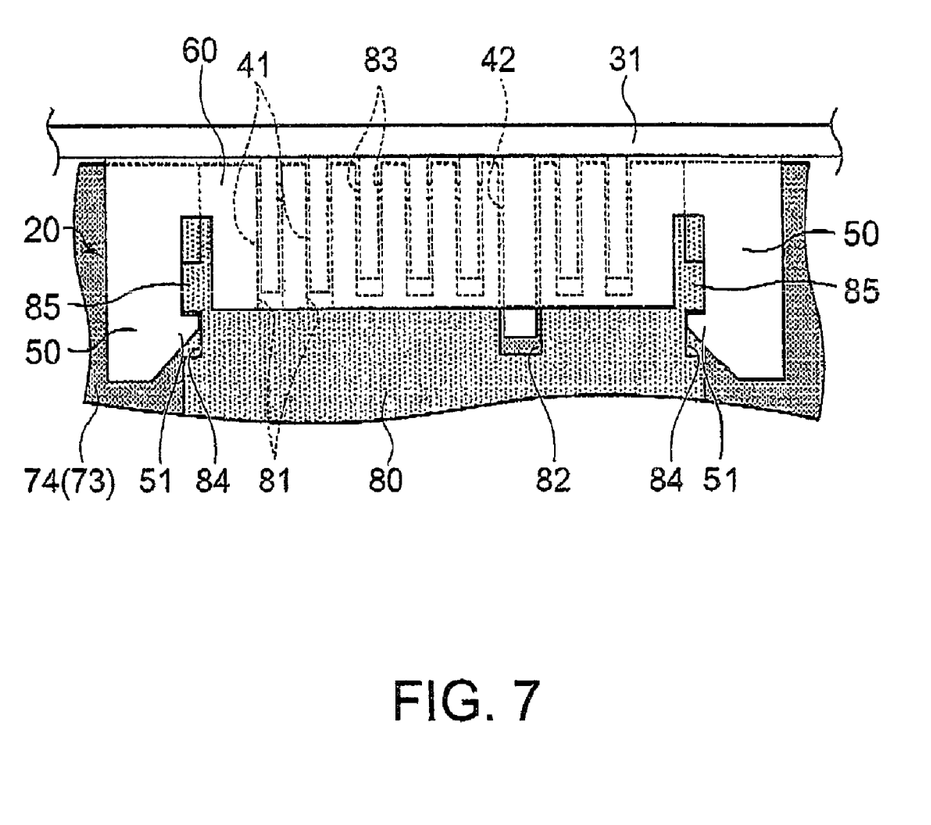
FIG. 7 is a top view of a state during which the battery connector is connected to the charging connector from the state shown in FIG. 6.

FIG. 3 is an enlarged view of a part of FIG. 1 corresponding to the charging connector 20 of the docking device 10 and the battery connector 80 of the battery pack 70. FIG. 4 is a side view of the charging connector 20. FIGS. 5-1 to 5-3 are perspective views for explaining a state during which the charging connector 20 is swung. FIG. 6 is a top view of FIG. 3 as seen in the direction A. FIG. 7 is a top view of a state during which the battery connector 80 is connected to the charging connector 20 from the state shown in FIG. 6.

As shown in FIG. 3, the charging connector 20 includes a battery holding plate member 30 that is disposed in an opening portion 15 formed in the back part of the left surface portion 11d of the device housing 11, a terminal portion 40 provided in the plate member 30, a pair of hook portions 50 provided on both sides of the terminal portion 40, and a cover portion 60 covering an upper part of the terminal portion 40.

As shown in FIGS. 3 and 4, the plate member 30 is shaped like the letter L in cross-section, and includes a terminal placement plate 31 that has approximately the same size as the opening portion 15 and is shaped like a rectangle in a plan view, and a guide plate 32 that has approximately the same size as the terminal placement plate 31 and extends perpendicularly from one end of the terminal placement plate 31. A corner portion 33 at which the terminal placement plate 31 and the guide plate 32 intersect with each other is supported by a horizontal shaft 34 disposed along a bottom part of the left surface portion 11*d* of the device housing 11 as shown in FIGS. 3 and 4, and the plate member 30 is supported so as to be swingable about the horizontal shaft 34 as shown in FIGS. 5-1 to 5-3.

The terminal placement plate 31 is made of plastic. The terminal portion 40, the hook portions 50, and the cover portion 60 mentioned above are protruded from a surface 35 of the terminal placement plate 31 facing the guide plate 32.

The terminal portion 40 includes multiple metal plugs 41 that engage slits 81 of the battery connector 80 described later so as to be electrically connected to terminals 83 formed in the slits 81, and a plastic guide 42 that engages a slit 82 of the battery connector 80. Each plug 41 is shaped like a flat plate, and connected to the charging device in the device housing 11 via a wire 43 as shown in FIG. 4. Each plug 41 is formed in accordance with a size of the slit 81 of the battery connector 80 which the plug 41 engages. The guide 42 is a member shaped like a flat plate, which is formed slightly larger than each plug 41 in width and protrusion length. When connecting the battery connector 80 to the charging connector 20, the guide 42 engages the slit 82 earlier than the plugs 41 for positioning. Note that a space between the guide plate 32 and bottom ends of the plugs 41 and the guide 42 is a placement space for a connector attachment portion 73 of the battery pack 70 described later.

The pair of hook portions 50 are disposed at upper positions on both sides of the terminal portion 40 approximately in parallel with each other, and a pair of claw portions 51 are formed inwardly (towards the terminal portion 40) at tips of the pair of hook portions 50, respectively. The claw portions 51 engage a pair of groove portions 84 formed in the battery connector 80, when the battery connector 80 of the battery pack 70 is connected to the charging connector 20. As shown in FIG. 7, when the device housing 11 moves in a horizontal direction, the hook portions 50 having the above-mentioned structure maintain the engagement with the groove portions 84 so that the connection state between the charging connector 20 and the battery connector 80 is maintained. On the other hand, when the device housing 11 moves in a vertical direction, the hook portions 50 disengage from the groove portions 84 so that the battery connector 80 is separable from the charging connector 20.

The cover portion 60 protects the terminal portion 40 from external contact and the like, by covering the upper part of the terminal portion 40. The cover portion 60 is formed to protrude from the terminal placement plate 31 longer than the plugs 41 of the terminal portion 40, as shown in FIG. 6. In the present embodiment, the cover portion 60 and the hook portions 50 are formed integrally by plastic.

Figure 51:
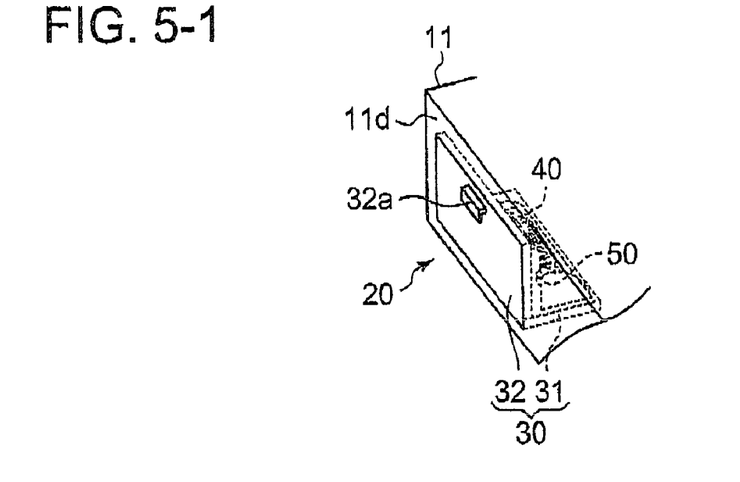
Figure 52:
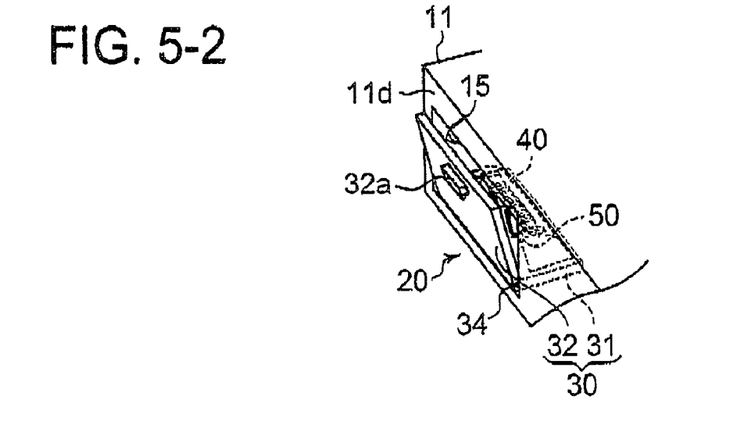
Figure 53:
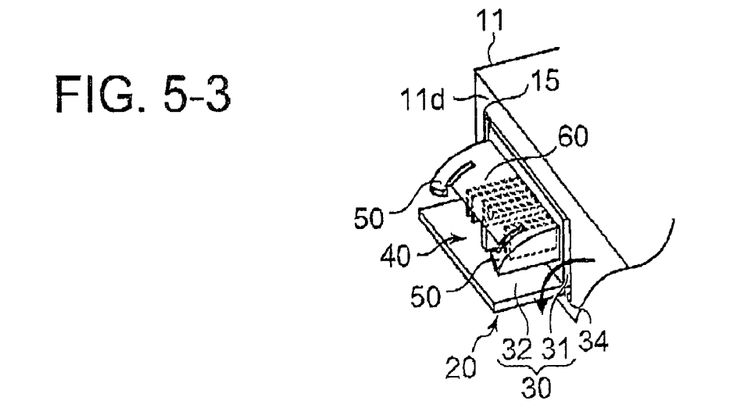

When the terminal portion 40 is externally exposed as shown in FIGS. 3 and 5-3, the guide plate 32 functions as a guide for leading the battery connector 80 so that the battery connector 80 is properly connected to the charging connector 20. When the terminal portion 40 is accommodated in the device housing 11 as shown in FIG. 5-1, on the other hand, the guide plate 32 functions as a lid member for closing the opening 15 of the device housing 11. In the present embodiment, the guide plate 32 is composed of an elastic body such as an elastomer.

The battery pack 70 supplies driving power to the laptop PC 1 by being mounted in the battery mounting portion of the laptop PC 1, as mentioned earlier. As shown in FIGS. 1 and 2, the battery pack 70 includes a battery accommodation portion 71 shaped like a thin rectangular parallel piped that is small in height in comparison with length and width, and the connector attachment portion 73 that extends from a longitudinal side surface 72 of the battery accommodation portion 71 and has a smaller height than the battery accommodation portion 71. A battery cell (not shown) for accumulating power supplied from the charging connector 20 is accommodated in the battery accommodation portion 71. Moreover, the battery connector 80 that is connectable to the charging connector 20 of the docking device 10 described above is provided on a top surface 74 of the connector attachment portion 73, as shown in FIG. 3.

The battery connector 80 is formed approximately in a rectangular parallel piped by a plastic having insulating properties, and includes the slits 81 in which the plugs 41 of the charging connector 20 described above are inserted and the slit 82 in which the guide 42 of the charging connector 20 is inserted. As shown in FIGS. 3 and 6, each of these slits 81 and 82 is formed by removing a part in a thickness direction of the battery connector 80 and its front (that is, the side facing the charging connector 20) and top are opened.

The number of slits 81 in which the plugs 41 of the charging connector 20 are inserted is seven in total, as shown in FIGS. 3 and 6. On inner walls of each slit 81, a pair of metal terminals 83 that contact the corresponding plug 41 are disposed so as to face each other. Note here that only the terminal 83 on one side is shown in FIG. 3. Moreover, the slit 82 in which the guide 42 of the charging connector 20 is inserted is larger in width and depth than the slits 81, and there are no terminals 83 on its inner wall surfaces.

Furthermore, the pair of groove portions 84 are provided in parts where a top surface of the battery connector 80 meets both side surfaces of the battery connector 80. The pair of groove portions 84 engage the claw portions 51 of the hook portions 50 of the charging connector 20 when the battery connector 80 is connected to the charging connector 20.

As described above, the docking device 10 in the present embodiment has a structure in which the ejector 14 and the like are disposed on the front part of the left surface portion 11*d* of the device housing 11. Therefore, to prevent the battery pack 70 which is being charged from interfering with the operation of the ejector 14, the battery pack 70 is positioned so as to protrude further backward from a side of a back end part of the docking device 10.

Note that the shape and size of the battery pack 70 are not limited to those shown in FIG. 1 and differ depending on the model of the laptop PC 1 used, but the same type of battery connector 80 is commonly adopted in each battery pack 70. Accordingly, the charging connector 20 of the docking device 10 can charge several types of battery packs 70 which differ in shape and size. In addition, a sum of a height of the battery connector 80 and a height of the connector attachment portion 73 is common in each battery.

An operation of connecting the battery connector 80 to the charging connector 20 and an operation of separating the battery connector 80 from the charging connector 20 are explained next, with reference to FIGS. 8 to 10.

When connecting the battery connector 80 to the charging connector 20, the docking device 10 and the battery pack 70 are both placed on the plane 100 such as the desk, as shown in FIG. 2. First, the plate member 30 in the charging connector 20 of the docking device 10 is swung to an appropriate angle from the state shown in FIG. 5-1, thereby externally exposing the terminal portion 40 as shown in FIG. 5-3. After this, the battery connector 80 of the battery pack 70 is positioned so as to face the charging connector 20.

Next, the battery connector 80 is horizontally moved closer to the front of the charging connector 20. From this state, the connector attachment portion 73 of the battery pack 70 is slightly lifted and, while sliding a bottom surface of the connector attachment portion 73 in contact with a top surface 36 of the guide plate 32 of the plate member 30, the slits 81 and 82 of the battery connector 80 are positioned in correspondence with the terminal portion 40 of the charging connector 20. Having done so, the guide 42 is inserted in the slit 82 and each plug 41 is inserted in the corresponding slit 81. In the process of this insertion, the hook portions 50 are elastically deformed as a result of the claw portions 51 of the hook portions 50 being pressed by convex portions 85 of the battery connector 80, and the battery connector 80 is pushed further to cause the claw portions 51 to engage the groove portions 84. Thus, each plug 41 of the charging connector 20 contacts the terminals 83 in the corresponding slit 81 of the battery connector 80 and is thereby electrically connected to the terminals 83, as a result of which the battery pack 70 becomes chargeable.

Figure 8:
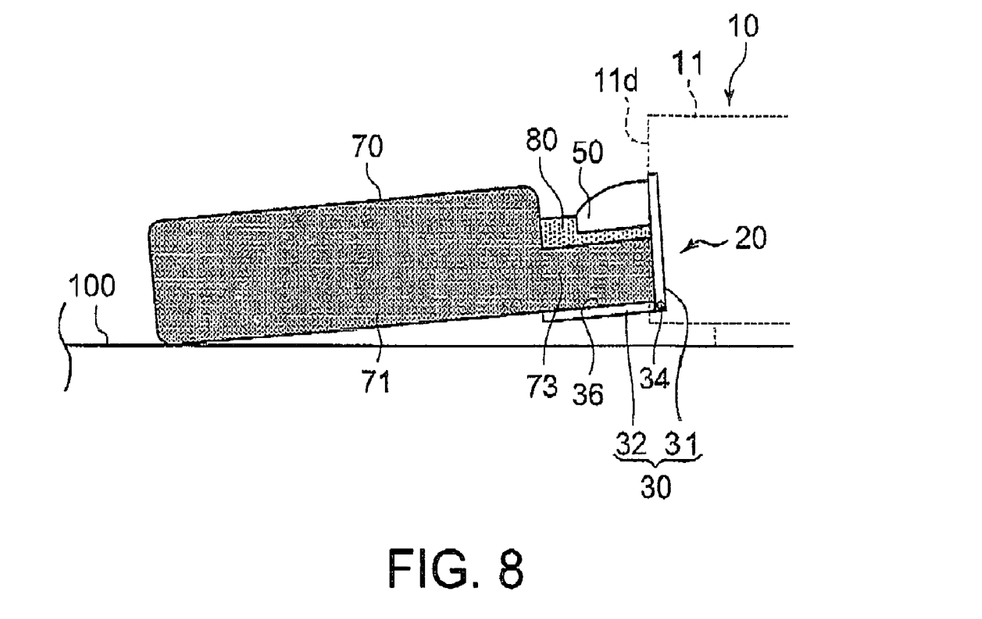
FIG. 8 shows a state of connection between the battery connector and the charging connector.

As shown in FIG. 8, in a state where the connection is completed, the connection state is reliably maintained by the hook portions 50 (claw portions 51), and also the connector attachment portion 73 is supported by the guide plate 32. In such a state, even when the device housing 11 is moved in the horizontal direction, the battery connector 80 is not detached from the charging connector 20. Moreover, since the battery pack 70 is connected to the charging connector 20 with its bottom being in contact with the plane 100, the battery pack 70 can be charged in a stable condition.

After the charging of the battery pack 70 is completed, by pressing the battery connector 80 down to elastically deform the guide plate 32 downward, the battery connector 80 moves downward and as a result the engagement between the hook portions 50 and the groove portions 84 is released. In this way, the battery connector 80 can be detached from the charging connector 20.

In the example shown in FIG. 8, the battery pack 70 has the flat bottom surface. Alternatively, when using the battery pack 70 in which the bottom surface of the connector attachment portion 73 is separate from the plane 100 as shown in FIG. 9 (that is, the connector attachment portion 73 is positioned higher than the one in the battery pack 70 shown in FIG. 8), the plate member 30 of the charging connector 20 is slightly swung clockwise from the position shown in FIG. 8. After this, while sliding the bottom surface of the connector attachment portion 73 of the battery pack 70 in contact with the top surface 36 of the guide plate 32 of the charging connector 20, the battery connector 80 is connected to the charging connector 20. In the example shown in FIG. 9, too, the battery pack 70 is connected to the charging connector 20 with its bottom being in contact with the plane 100, so that the charging can be performed in a stable condition.

Figure 9:
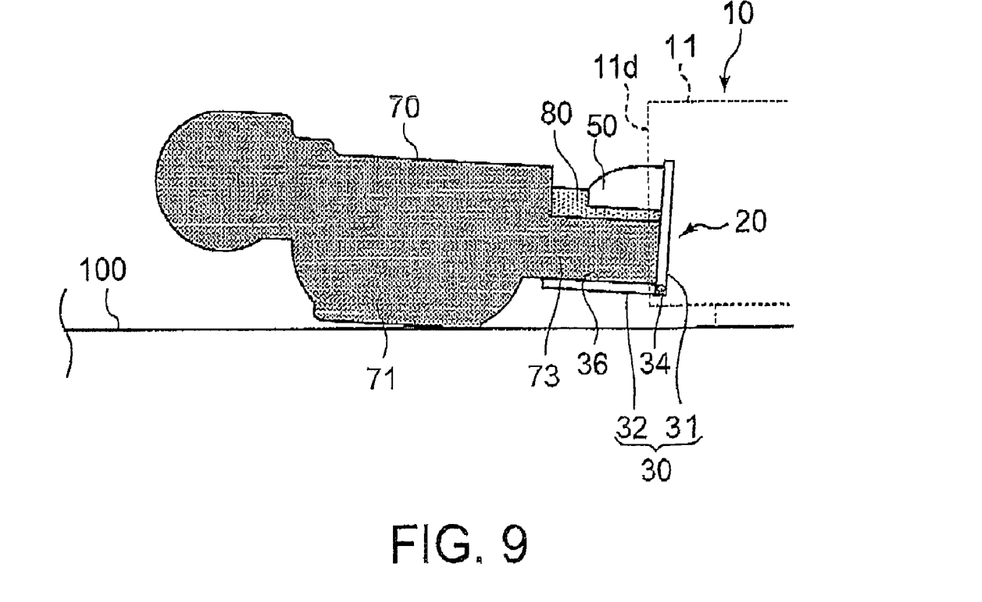
FIG. 9 shows a state of connection between the battery connector and the charging connector.

Moreover, though not shown, when using the battery pack 70 in which the connector attachment portion 73 is positioned still higher than the one shown in FIG. 9, by swinging the plate member 30 further clockwise from the position shown in FIG. 9, the attachment can be performed with the bottom of the battery pack 70 being in contact with the plane 100 in the same way as the examples shown in FIGS. 8 and 9.

For example, if the device housing 11 is lifted by the user when the charging connector 20 and the battery connector 80 are connected as shown in FIGS. 8 and 9, there is a possibility that the battery pack 70 drops off the charging connector 20 and falls to the ground, and the battery pack can be damaged on impact. In view of this, the present invention employs a structure in which the connection state between the charging connector 20 and the battery connector 80 is maintained if the device housing 11 is lifted within a predetermined height from the plane 100 when the charging connector 20 and the battery connector 80 are in a connected state, and the battery connector 80 is separated from the charging connector 20 by a self weight of the battery pack 70 if the device housing 11 is being lifted beyond a predetermined height from the plane 100.

The lifting height of the device housing 11 over which the battery pack 70 is separated from the charging connector 20 is determined by tradeoffs between the weight of the battery pack 70, the elasticity of the guide plate 32, the swinging angle of the plate member 30, and the like.

As an example, the charging connector 20 can be configured so that the guide plate 32 is elastically deformed when the entire weight of the battery pack 70 is put on the connection part between the battery connector 80 and the charging connector 20 is explained below. When the device housing 11 is lifted when the battery connector 80 is connected to the charging connector 20 as shown in FIGS. 8 and 9, if at least one part of the bottom of the battery pack 70 is in contact with the plane 100, the self weight of battery pack 70 is only partially put on the connection part between the battery connector 80 and the charging connector 20, so that the guide plate 32 is hardly elastically deformed. Therefore, the battery connector 80 is not separated from the charging connector 20, and the connection state between the battery connector 80 and the charging connector 20 is maintained.

Figure 10:
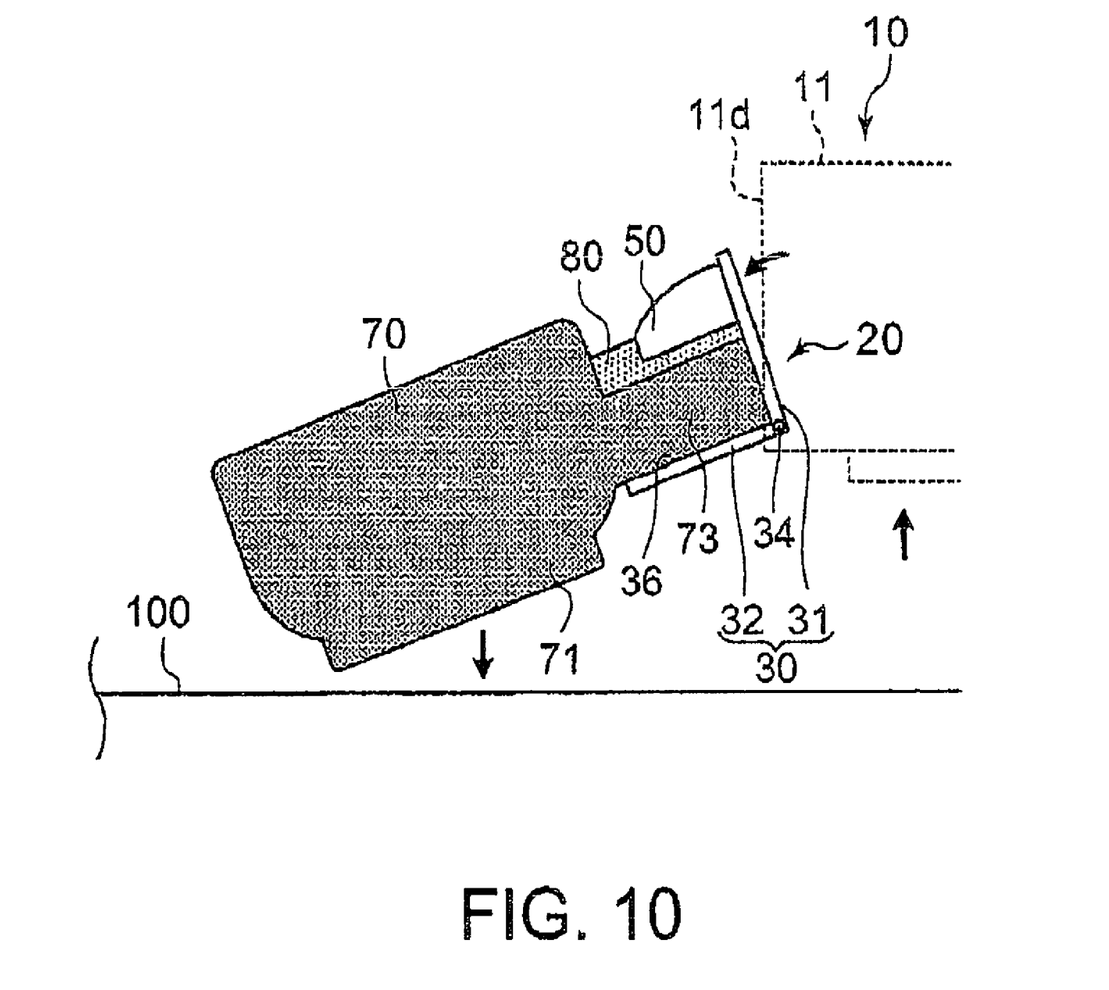
FIG. 10 is an explanatory view of a state during which the battery connector is separated from the charging connector.

From this state, when the device housing 11 is further lifted upward as shown in FIG. 10, at the point when the bottom of the battery pack 70 completely leaves the plane 100, the whole self weight of the battery pack 70 is put on the connection part between the battery connector 80 and the charging connector 20, which causes the guide plate 32 to be elastically deformed downward and the battery connector 80 (battery attachment portion 73) to move downward. As a result, the engagement between the groove portions 84 of the battery connector 80 and the claw portions 51 of the charging connector 20 is released, and the plugs 41 and the guide 42 come out of the upper openings of the slits 81 and 82. Thus, the battery connector 80 is separated from the charging connector 20.

In the above-mentioned example, when the device housing 11 is lifted from the plane 100, the connection state between the battery connector 80 and the charging connector 20 is maintained as long as the bottom of the battery pack 70 is in contact with the plane 100, and the battery connector 80 is separated from the charging connector 20 at the point when the device housing 11 is lifted to the height shown in FIG. 10 and the bottom of the battery pack 70 leaves the plane 100.

Note that the above-mentioned structure is one example and the present invention is not limited to such structure. For example, a structure of separating the battery connector 80 at the point when the self weight of the battery pack 70 is partially put on the connection part between the battery connector 80 and the charging connector 20 may be used.

As explained above, if the device housing 11 is moved within a predetermined height from the plane 100 when the charging connector 20 and the battery connector 80 are in the connection state, the connection state between the charging connector 20 and the battery connector 80 is maintained. If the device housing 11 is moved beyond the predetermined height from the plane 100, on the other hand, the battery connector 80 is separated from the charging connector 20 by the self weight of the battery pack 70. With this structure, it is possible to prevent the battery pack from dropping from such a height that can cause damage to the battery pack 70.

Also, the plate member 30 is provided on the side surface portion (left surface portion) 11d of the device housing 11 so as to be swingable about the horizontal shaft 34, and the charging connector 20 is held by the plate member 30. With this structure, it is possible to charge several types of battery pack 70 which differ in the height of the connector attachment portion 73.

Furthermore, the hook portions 50 that engage the groove portions 84 formed in the battery connector 80 are provided in the charging connector 20. When the device housing 11 moves in the horizontal direction, the engagement with the groove portions 84 is maintained so that the connection state between the charging connector 20 and the battery connector 80 is maintained. When the device housing 11 moves in the vertical direction, the engagement with the groove portions 84 is released so that the battery connector 80 is separable from the charging connector 20. With this structure, the connection state between the battery connector 80 and the charging connector 20 can be reliably maintained and, in the case where the device housing 11 is lifted by the user, the battery connector 80 can be promptly dropped off the charging connector 20.

Moreover, the guide plate 32 for guiding the battery connector 80 to the charging connector 20 when connecting the battery connector 80 to the charging connector 20 is provided. With this structure, the battery connector 80 can be properly connected to the charging connector 20.

The guide plate 32 is composed of an elastic body. With this structure, the battery connector 80 can be promptly and stably dropped off the charging connector 20 when compared with the guide plate 32 being composed of a rigid material.

As has been described, the present invention provides a docking device that is mechanically and electrically connected to a portable computer to expand the capabilities of the portable computer.

While the invention has been particularly shown and described with reference to a preferred embodiment, it will be understood by those skilled in the art that various changes in form and detail may be made therein without departing from the spirit and scope of the invention.

What is claimed is:

1. A docking device comprising:
a device housing; and
a charging connector, which is located on a side surface of said device housing, is capable of being connected to a battery connector of a battery pack in order to charge said battery pack, wherein said charging connector is connectable to said battery connector in a state where said battery pack and said device housing are disposed on the same plane, wherein after said charging connector has been connected to said battery connector, said battery connector remains to be connected to said charging connector when said device housing is moved to a position within a predetermined height from said plane, but said battery pack separates from said battery connector by the weight of said battery pack when said device housing is moved to a position beyond said predetermined height from said plane.

2. The docking device of claim 1, wherein said charging connector includes a plate member provided on a side surface portion of said device housing so as to be swingable about a horizontal shaft, and a terminal portion is provided in said plate member.

3. The docking device of claim 1, wherein said charging connector further includes a hook portion provided in said plate member and engages a groove portion formed in said battery connector, wherein when said device housing is being moved in a horizontal direction, said hook portion maintains the engagement with said groove portion so that said charging connector remains to be connected to said battery connector.

4. The docking device of claim 3, wherein when said device housing is being moved in a vertical direction, said hook portion disengages from said groove portion so that said battery connector separates from said charging connector.

5. The docking device of claim 2, wherein said plate member includes a guide member for guiding said battery connector to said terminal portion of said charging connector when said battery connector is being connected to said charging connector.

6. The docking device of claim 5, wherein said guide member is composed of an elastic body.

* * * * *